United States Patent [19]

Enders

[11] Patent Number: 4,582,557

[45] Date of Patent: Apr. 15, 1986

[54] TIRE BUILDING MACHINE AND METHOD

[75] Inventor: George E. Enders, Salem, Ohio

[73] Assignee: NRM Corporation, Columbiana, Ohio

[21] Appl. No.: 560,554

[22] Filed: Dec. 12, 1983

[51] Int. Cl.[4] .............................................. B29D 30/32
[52] U.S. Cl. .................................. 156/401; 156/403; 156/132; 156/135
[58] Field of Search ............... 156/400, 401, 402, 403, 156/394.1, 131–132, 135

[56] References Cited

U.S. PATENT DOCUMENTS

| | | | |
|---|---|---|---|
| 1,923,062 | 8/1933 | Bearman | 156/403 |
| 3,093,531 | 6/1963 | Frohlich et al. | 156/400 |
| 3,582,435 | 6/1971 | Frazier | 156/403 |
| 3,784,426 | 1/1974 | Woodhall et al. | 156/403 |
| 3,871,942 | 3/1975 | Henley et al. | 156/403 |
| 3,950,212 | 4/1976 | Bullman | 156/403 |

Primary Examiner—Lois E. Boland

Attorney, Agent, or Firm—Renner, Otto, Boisselle & Lyon

[57] ABSTRACT

A tire building machine and method characterized by the employment of a rigid annular bead support at each end of and coaxial with the axis of a tire building drum for holding a tire bead in round and centered to the drum axis during bead placement, after bead placement and during a subsequent ply turn-up operation. The bead support preferably is in the form of a precision machined register ring preferably supported independently of the drum and having a radially outer bead support surface which extends slightly axially beyond a shoulder end face of the drum in radially inwardly offset relation to such end face. During bead placement and/or limited axial outward movement of the register ring, the register ring serves to wipe and firmly stitch interposed ply material to the inner diameter of the tire bead. During such wiping action, the bead may be axially held in place by an inflating turn-up bladder or by a bead setter utilized to set the bead at the drum end.

19 Claims, 3 Drawing Figures

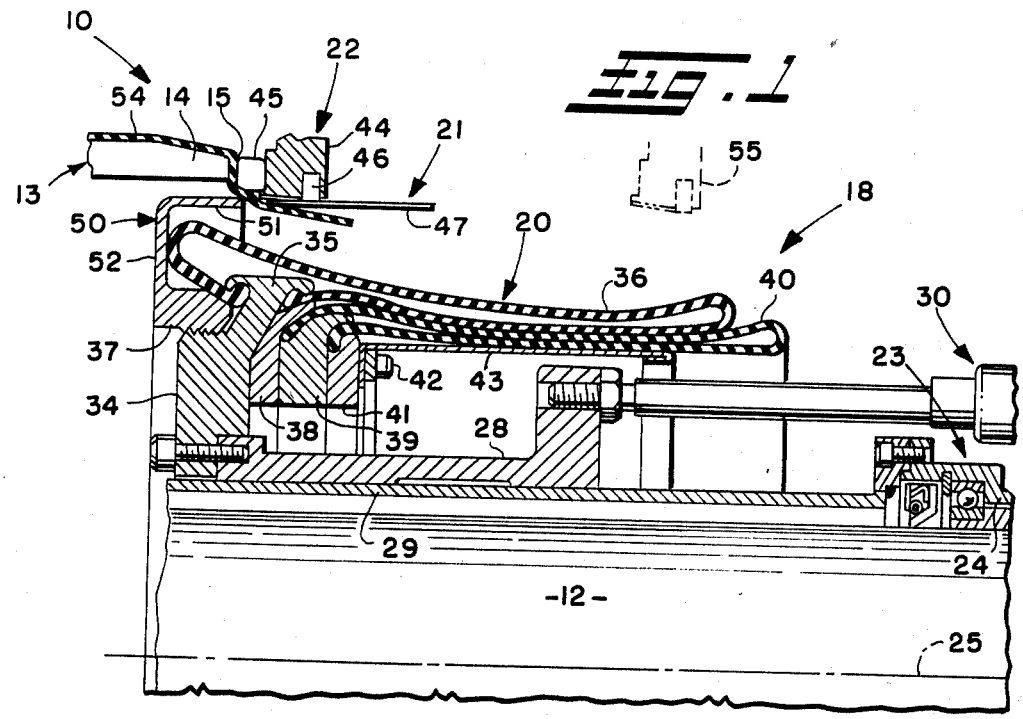
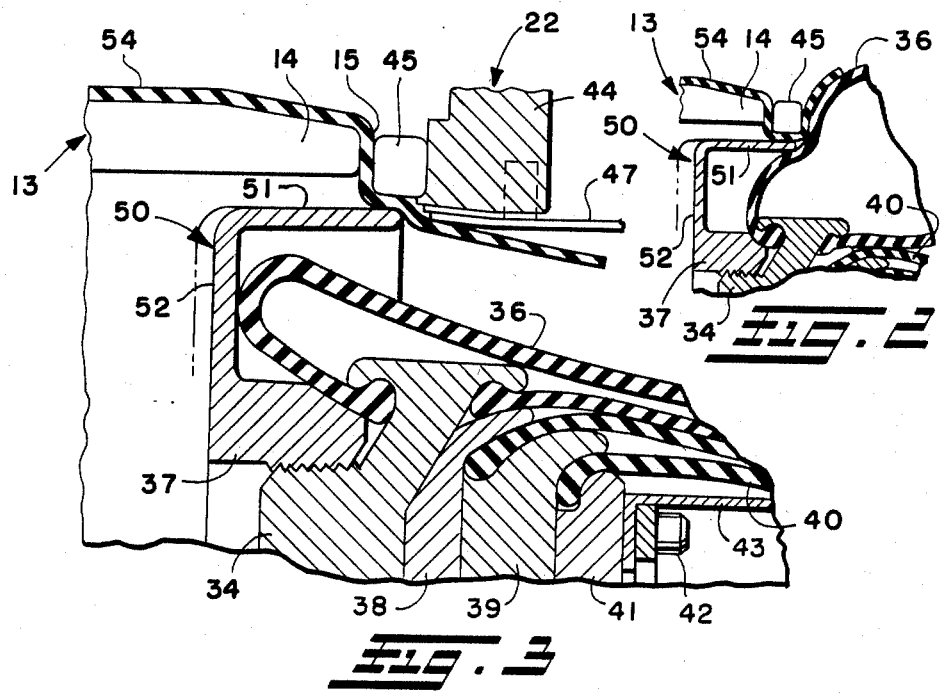

TIRE BUILDING MACHINE AND METHOD

DISCLOSURE

This invention relates generally to tire building machines and methods and more particularly to a tire building machine and method which ensures accurate tire bead registry and tight wrapping of ply material around the bead during construction of a tire ply band.

BACKGROUND

Tire building machines heretofore have been known to employ a finger ply-down, bead setter and bladder turn-up at each axial end of a tire building drum. After ply material is applied in cylindrical fashion on the drum with the edges thereof extending axially beyond the ends of the drum, the ply downs are indexed axially towards the drum and operated to turn or fold the ply edges down over respective ends of the drum. Then tire beads are pressed into place against the turned down ply edges at the drum ends by the bead setters which include bead setting rings or the like for holding the beads centered therein during bead placement. Once the beads have been set in place, the tackiness of the uncured ply material is relied upon to hold the beads in place at the drum ends as the bead setters and ply downs are axially retracted away from the drum for subsequent turn-up and stitching of the ply edges around the beads by the bladder turn-ups.

While such machines generally perform satisfactorily, some problems exist in connection therewith. For example, any off center (axis) misalignment of the bead setters with respect to the tire building drum or machine axis will result in out of register placement of the beads at the ends of the drum both with respect to the drum as well as each other. Such misalignment may result from normal wear tolerances of the bead setters or from misadjustment of the bead setting rings. Moreover, the bead setting rings typically are supported in cantilever fashion when fully extended for bead placement whereby any play or flexing of the cantilever support may result in off center placement of the beads at the drum ends. In any event, the beads held only by the tackiness of the ply material may move off center during the turn-up operation.

Another problem is that initial progressive wrapping of the tire ply material at the inner diameter of the bead by the bladder turn-up may not be as tight as desired especially when the ply material is particularly stiff as in the case of wire, dual cross ply aramids or cross-woven nylons. Such initial wrapping usually occurs before full inflation of the turn-up bladder or bladders and hence before attainment of full wrapping and pressing forces. Consequently, proper material flow may not be obtained and air entrapment may occur.

SUMMARY OF THE INVENTION

An improved tire building machine and method according to this invention provides for precise registry of tire beads at the ends of a tire building drum during bead placement as well as during the ply turn-up operation. The invention also provides for tight initial tangential wrapping of the ply material at the inner diameter of the tire beads even when the ply material is particularly stiff. As a further advantage of the invention, existing tire building machines and designs may be easily and inexpensively retrofitted to obtain the desirable and advantageous results of the invention.

Briefly, a tire building machine and method according to the invention are characterized by the employment of a rigid annular bead support at each end of and coaxial with the axis of a tire building drum for holding a tire bead in round and centered to the drum axis during bead placement, after bead placement and during the subsequent ply turn-up operation. The bead support preferably is in the form of a precision machined register ring mounted independently of the drum for axial movement towards and away from the drum, as on a bladder ply turn-up mounted concentrically on the drum's main drive shaft for axial movement. When in an operative position, the register ring has a radially outer, circular bead support surface which extends slightly axially beyond the end face of an axially extending shoulder of the drum in radially inwardly offset relation to such end face. Such bead support surface has a selected diameter less than the inner diameter of the tire bead by an amount no greater than and preferably slightly less than the thickness of the ply material radially inwardly underlying the placed tire bead. Also, the extent of axial projection is selected to be an amount at least greater than the thickness of the ply material at the end face of the drum shoulder, whereby such surface serves to concentrically locate the bead during placement thereof against the turned down ply material and then to hold the bead in centered registry to the drum axis and to the similarly registered bead at the other end of the drum. During bead placement, the register ring may serve to wipe and firmly stitch the interposed ply material to the inner diameter of the tire bead.

Further in accordance with the invention, the register ring when positioned at the drum end preferably is constrained for limited axial movement relative to the drum shoulder. Initially the ring is located in its axially innermost position such that the bead support surface thereof only slightly radially underlies the tire bead when the latter is placed thereover and against the folded down ply material at the end face of the drum shoulder by the bead setter. After such bead placement and upon commencement of the turn-up operation, the register ring is forced axially outwardly towards its outermost constrained position as by the action of the inflating bladder progressively to wipe and hence tightly stitch the overlying ply material to the inner diameter of the tire bead. Further to control ply material flow at the wrap, the bead support surface can be serrated or contoured as desired and/or needed.

As an alternative arrangement according to the invention, such initial tangential wiping or stitching of the ply material to the inside diameter of the bead may be effected by axially outwardly indexing the register ring a short distance while the bead is held against the drum shoulder by the bead setter. Thereafter, the bead setter is retracted and the bladder turn-up operated to complete progressive wrapping of the ply material around the bead which continues to be held in proper centered registry by the register ring.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary longitudinal section through a tire building machine employing a bead register ring according to the invention, the machine being shown just after a tire bead has been set against turned down ply material at a shoulder of the drum;

FIG. 2 is a view similar to that of FIG. 1 but illustrating the machine just after commencement of the ply turn-up operation and initial wrapping of ply material at the inner diameter of the bead; and FIG. 3 is another view similar to FIG. 1, but illustrating another manner of effecting initial wrapping of ply material at the inner diameter of the bead according to the invention.

DETAILED DESCRIPTION

Referring now in detail to the drawing and initially to FIG. 1, there is illustrated generally at 10 a portion of a preferred form of tire building machine according to the present invention which may be used in the manufacture of conventional passenger or truck tires. The machine illustrated is operative as a first stage machine to construct tire ply bands which may later be shaped to a toroid or tire shape on a second stage machine where other tire components such as belts and/or treads are assembled. It however will be appreciated that principles of the present invention may have application in other types of tire building machines such as a single stage machine wherein the tire ply band is both constructed and shaped.

The tire building machine 10 for the most part may be of conventional design such as that manufactured and sold by applicant's assignee under the designation "88TBM". The machine includes a main drive shaft 12 for supporting thereon a tire building drum partly seen at 13. The drum 13 may be of conventional radially expandable type with suitable mechanisms being provided first to expand the drum to an enlarged cylindrical configuration for proper placement of ply material thereon and later to contract the drum to permit removal of a finished tire ply band. The ply material supporting surface of the drum may be formed by a plurality of radially movable, arcuate sectors which at each axial end of the drum collectively form an axially outwardly extending, circumferential shoulder seen at 14. Such shoulder has a radially extending end face 15 and, as desired, may be radially inwardly tapered at its radially outer surface at a small angle as shown.

The tire building machine 10 also includes an inboard assembly 18 mounted adjacent one end of the tire building drum 13. Although not shown, the tire building machine also includes an outboard assembly at the opposite end of the drum. Only the pertinent portions of the inboard assembly 18 are shown and described hereinafter in detail inasmuch as the outboard assembly is substantially identical in construction and operation to the inboard assembly. It is noted however that the outboard assembly as a unit or components thereof may be mounted for axial separation from the drum shaft 12 to permit removal of a finished tire ply band from the drum as well as placement of tire beads in the inboard and outboard assemblies prior to formation of another tire ply band.

The inboard assembly 18 comprises a dual bladder ply turn-up 20, a spring finger ply-down partly seen at 21 and a bead setter partly seen at 22. Such components may be and preferably are commonly supported for independent axial movement on an annular support mounted on and concentric with the drum shaft 12. As shown, the support 23 has an axially elongate hub 24 bearing-mounted on the drum shaft 12 and such support may be fixed against both axial movement and rotation or otherwise may be moved axially and even rotated on the drum shaft if desired. The support 23 may for example be fixed by suitable hardware to a housing located to the right in FIG. 1 in which a mount and drive for the drum shaft 12 may be housed. For precision in tire construction, the components of the inboard assembly are mounted concentric with the axis 25 of the drive shaft 12 which coincides with the axial centerline of the machine 10 and drum 13.

The dual bladder ply turn-up 20 is mounted on the support 23 for axial movement towards and away from the tire building drum 13 by an annular shuttle 28 and a cylindrical shaft sleeve 29. The shuttle 28 is slidably received on the shaft sleeve 29 which is connected to the support hub 24 at the axially inner end of the latter. Axial movement of the shuttle 28 is obtained by actuation of an axially extending piston-cylinder assembly 30 of a bladder lock mechanism. By actuating the assembly 30, the shuttle 28 may be moved axially toward and away from the drum 13 as required during the tire building operation. In addition, the bladder lock assembly may be provided with suitable adjustable stops to limit the extent of axial inward movement of the shuttle 28 for proper positioning of the turn-up 20 relative to the tire building drum as hereinafter indicated. For a reason discussed hereinafter, the shuttle 28 after movement to its axially innermost position seen in FIG. 1 may be constrained by the lock mechanism for limited axial movement from such innermost position to a slightly axially outward position seen in FIG. 2. Such constrained limited axial movement of the shuttle 28 may be provided in any suitable manner such as by providing clearance in the lock mechanism.

At its axially inner end (to the left in FIG. 1), the shuttle 28 has attached thereto a radially extending plate 34 of the ply turn-up 20. The plate 34 has an annular radial projection 35 of generally T-shape cross section, the stem of which extends slightly axially outwardly (to the right in FIG. 1) as well as radially outwardly. The flanges of the T-shape projection extend axially in opposite directions and terminate at radially inwardly projecting terminal ends which define annular grooves in which are received the beads of an annular folded bladder 36. The axially inner bead of the outer bladder 36 is retained in the axially innermost groove by a wedge ring 37 which is secured to the radial plate 34. As shown, the wedge ring 37 is threaded at its inner diameter for threaded receipt on an outwardly threaded portion of the radial plate 34 for precise concentric mounting on the radial plate 34 which in turn is precisely centered to the axis 25 of the drive shaft 12 in the above noted manner. The other or axially outer bead of the bladder 36 is retained in the other annular groove of the T-shape projection 35 by a clamp ring 38 positioned axially outwardly of the radial plate 34. The clamp ring 38 is secured in place in jigsaw puzzle-like manner between the radial plate 34 and a second axially outwardly disposed ring 39. The ring 39 forms with the clamp ring 38 another groove for receipt and retention of the axially inner bead of another bladder 40 disposed radially inwardly of the first bladder 36 when both bladders are deflated. The other bead of the inner bladder 40 is retained in an axially outwardly opening groove in the ring 39 by a clamp ring 41 which is secured, along with the rings 38 and 39, to the radial plate 34 by common fasteners, one being seen at 42. The fasteners 42 also secure to the clamp ring 41 an axially outwardly extending bladder support cylinder or can 43.

As seen in FIG. 1, the inner bladder 40 when deflated lies substantially flat and is supported over much of its length by the support can 43. The outer bladder 36 when deflated lies substantially flat over the inner bladder 40. Both bladders are of folded type, the outer bladder being folded at its axially inner and outer edges and the inner bladder being folded at its axially outer edge. Although folded type bladders are shown, other types of bladders may be employed, such as tubular bladders in a manner generally similar to that shown in applicant's U.S. Pat. No. 4,302,274. The invention also is not necessarily limited to the use of dual bladder turn-ups inasmuch as desirable and advantageous results may be obtained in tire building machines employing other types of turn-ups such as single bladder turn-ups with bladder pusher mechanisms.

The finger ply-down 21 and bead setter 22 also are mounted concentric with the machine axis 25 for axial movement towards and away from the tire building drum 13 as in conventional manner. As seen in FIG. 1, the bead setter 22 includes a bead setting ring 44 which has a short axially inwardly extending projection or shelf adapted to receive and hold a tire bead 45. The bead setting ring 44 also has at its inner diameter an annular groove which receives a plastic ply-down finger camming ring 46 which projects radially inwardly for operative engagement with each ply-down finger 47 of the ply-down 21 which may be of the type more particularly shown and described in Yuhas U.S. Pat. No. 4,353,771. Reference may be had to such patent for the particular manner in which the spring fingers 47 are actuated to fold ply material down over the end of the drum prior to placement of the bead 45 by the bead setter 22 against the turned down ply material at the end face 15 of the drum shoulder 14. It is noted, however, that other means may be employed to perform the ply-down operation.

To the extent thus far described, the tire building machine generally is of conventional design. As will become more apparent from the following description, the present invention provides an improvement over such design and which may be retrofitted into existing tire building machines and designs. Although the improvement is being shown with respect to the illustrated type of tire building machine, such is not intended to limit the scope of the invention inasmuch as principles thereof may be applied advantageously in other types of tire building machines.

In accordance with the present invention, an improved tire building machine is obtained by the employment of a rigid annular bead support at each axial end of the tire building drum for holding a tire bead in round and centered to the drum axis after placement of the bead and retraction of the bead setter as during a subsequent ply turn-up operation. The annular bead support preferably is in the form of a precision machined register ring seen at 50 in FIG. 1 which is concentric with the machine axis 25. The illustrated register ring 50 is generally L-shape in transaxial cross section and has a radial outward, axially extending leg forming a bead support band 51 and an axially inner, radially inwardly extending leg forming a flange or web 52 that may be integrally formed with the axially inner wedge ring 37 of the ply turn-up 20 as shown.

Although the register ring 50 may be otherwise mounted concentric with the machine axis 25, its provision on the ply turn-up 20 facilitates conversion of the tire building machine for use with different sizes of tires inasmuch as the register ring and turn-up may be removed and replaced as a unit for each tire size. As will be seen, dimensions and positioning of the register ring are dependent upon bead size as well as on the thickness of ply material being employed in the tire ply band construction operation which will now be briefly described in pertinent part.

In the operational cycle of the tire building machine 10, the ply turn-up 20 is axially indexed toward the drum 13 to its position seen in FIG. 1 after the drum has been radially expanded for application of ply material thereon. Consequently, the register ring 50 also is indexed to its position seen in FIG. 1. When in such position, the axially outer end portion of the bead support band 51 projects lightly axially outwardly beyond the end face 15 of the drum shoulder 14 in radially inwardly offset relation to such end face.

Ply material 54 then is applied circumferentially around the drum 13 with each circumferential edge thereof extending axially outwardly beyond a respective end of the drum. Thereafter, the ply-down 21 is indexed axially into position adjacent the drum and then actuated by inward movement of the bead setter 22 in known manner to fold the ply edge down over the end face 15 of the drum shoulder 14. In FIG. 1, the ply-down operation has been completed and the tire bead 45 carried by the bead setter has been telescoped over the projecting end portion of the bead support band 51 and set into place against the end face of the drum shoulder with turned down ply material interposed between the bead and shoulder end face as well as between the bead and the bead support band.

In axial relation to the set bead 45, the bead support band 51 projects axially beyond the drum shoulder end face 15 by a selected amount greater than the thickness of the ply material turned down over the end face as on the order of a small fraction of the axial thickness of the bead. In radial relation, the support band has an outer diameter less than the inner diameter of the bead by a selected amount at least equal to and preferably less than the thickness of the ply material interposed between the bead and support band. As a result, the support band operates through the interposed ply material to concentrically locate the bead with respect to the machine axis 25 as the bead is telescoped thereover and set in place by the bead setter 22, and further to hold the bead centered after retraction of the bead setter to its phantom line position seen at 55 in FIG. 1. Moreover, as the bead is being telescoped over the support band, the latter may commence initial tangential wrapping of the ply material at the axially innermost portion of the bead's inner diameter. In order to help resultant material flow, the outer diameter surface of the support band may be serrated and/or contoured as desired.

After the bead setter 22 and ply-down 21 have been retracted and with the tire bead 45 held registered to the machine axis 25 by the register ring 50, the outer bladder 36 is inflated progressively to wrap and turn up the overhanging ply material. As the outer bladder inflates and begins wrapping around the bead, reactionary forces may be utilized to cause the bladder turn-up 20 to move axially outwardly from its FIG. 1 position (the phantom line position in FIG. 2) to its FIG. 2 position where it is constrained as above indicated from further axially outward movement. Consequently, the register ring also is moved axially outwardly progressively to wipe or stitch the ply material to the inside diameter of the tire bead. The amount of wiping force will be determined by the radial spacing between the support band 51 and bead 45 which controls the degree of pinch on the interposed ply material. It will be appreciated that this wiping action takes place at a time when the outer bladder 36 may not be at full pressure thereby to provide for tight wrapping of even particularly stiff ply materials during the early phase of the ply turn-up operation.

Alternatively, such initial tangential wiping or stitching of the ply material to the inside diameter of the tire bead 45 may be effected by axially outwardly indexing the turn-up 20 and consequently the register ring 50 a short distance while the tire bead 45 remains held against the drum shoulder 14 (actually the interposed ply material) by the bead setter 22 as illustrated in FIG. 3. Like before, the register ring, as it is moved axially outwardly (from its phantom line position in FIG. 3), will progressively wipe or stitch the ply material to the inside diameter of the tire bead, the bead then being held against axial outward displacement by the bead setter rather than the bladder. Thereafter, the bead setter is retracted and the bladder turn-up operated as above indicated to complete progressive wrapping of the ply material around the bead which continues to be held in proper centered registry by the register ring.

In either case, the machine's operational cycle may thereafter be completed in conventional manner. That is, the inner bladder 40 may be inflated to cause the inflated outer bladder 36 to wrap around the tire bead 45 and roll over the drum 13 to complete the turn-up operation. Thereafter, the bladders are deflated, the ply turn-up 20 retracted and then the drum contracted to allow removal of the finished tire ply band.

Although the invention has been described with respect to the illustrated components at one end of the tire building drum 13, the description is for the most part equally applicable to the components at the other end of the drum. As is preferred, operation of like components at each end of the drum may be effected simultaneously by suitable controls.

In view of the foregoing, it can now be seen that an improved tire building machine and method may be provided which ensure precise registry of tire beads at the ends of a tire building drum during bead placement as well as during a subsequent ply turn-up operation. The machine and method also provide for tight initial tangential wrapping of the ply material at the inner diameter of the tire beads even when the ply material is particularly stiff. Moreover, existing tire building machines may be easily retrofitted to obtain the benefits and advantages of the invention. This, for example, can simply be done by substituting a register ring/wedge ring like that illustrated for the axially inner wedge ring commonly employed to secure the axially inner bead of a turn-up bladder in dual and even single bladder turn-ups. Register rings of one form or another according to the invention also otherwise may be secured to the ply turn-ups or alternatively mounted directly on the drum shaft or on a drum shaft sleeve for concentric positioning in relation to the axis of the machine and drum.

As a further but less desirable modification, a register ring or the equivalent may be mounted to the drum in fixed relation to the drum shoulder. In such case, the register ring may consist of circumferentially arranged segments fixed to respective surface forming segments of the tire building drum for radial expanding and contracting movement therewith. This is less desirable since the register ring or segments thereof would be subject to the same radial wear tolerances as the drum. Although such tolerances can usually be tolerated in the tire area between the beads, high precision tires require greater tolerance control in the bead areas.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

I claim:

1. In a tire building machine, a tire building drum for receiving tire ply material with at least one edge of such ply material extending axially beyond an end of said drum, means for folding the ply edge down over the end of said drum, axially movable bead setting means for setting a tire bead against the end of said drum with folded down ply material interposed between the bead and drum end, rigid annular bead support means coaxial with said drum operative through interposed ply material to locate the tire bead and then hold the tire bead in centered registry to the drum axis after retraction of said bead setting means, and bladder ply turn-up means for progressively wrapping the ply edge around the bead, said bead support means including an axially oriented cylindrical band having a bead support surface at its outer diameter, and said band being disposed radially outwardly of the inner axial end of an inflatable bladder in said turn-up means, which bladder is supported in generally cylindrical fashion when deflated.

2. A machine as set forth in claim 1, wherein said drum has an axially extending shoulder terminating at an annular radially extending end face against which the bead is set in place, and said band and bladder are positioned radially inwardly of said shoulder at their inner axial end portions.

3. A machine as set forth in claim 2, wherein said drum is radially expandable and collapsible, and further comprising means for axially moving said band and bladder towards and away from said drum respectively to position the same as aforedescribed when the drum is expanded and to retract the same to allow drum collapse.

4. A machine as set forth in claim 1, further comprising means for allowing limited axial outward movement of said turn-up means adjacent said drum, and wherein said band is fixed to said turn-up means for movement therewith from an axially inner bead receiving position to an outer position progressively to wipe overlying ply material against the inner diameter of the tire bead.

5. A machine as set forth in claim 4, wherein such axial wiping movement of said band is effected by the action of the inflating bladder.

6. In a tire building machine, a tire building drum for receiving tire ply material with at least one edge of such ply material extending axially beyond an end of said drum, means for folding the ply edge down over the end of said drum, axially movable bead setting means for setting a tire bead against the end of said drum with folded down ply material interposed between the bead and drum end, and rigid annular bead support means coaxial with said drum operative through interposed ply material to locate the tire bead and then hold the tire bead in centered registry to the drum axis after retraction of said bead setting means, said drum having an annular radially extending end face against which the bead is set in place by said bead setting means, said bead support means having a radially outer, substantially cylindrical bead support surface which extends axially beyond said end face in radially inwardly offset relation to said end face, and said bead support means being movable axially outwardly from a bead receiving position progressively to wipe overlying ply material against the inner diameter of the bead.

7. A machine as set forth in claim 6, wherein said bead support means includes an annular register ring forming said bead support surface.

8. A machine as set forth in claim 7, wherein said drum is concentrically mounted on a drive shaft therefor, and said register ring is rigidly radially supported on said drive shaft.

9. A machine as set forth in claim 8, further comprising bladder ply turn-up means for progressively wrapping the ply edge around the bead, said turn-up means being radially supported on said drive shaft and said register ring on said turn-up means.

10. A machine as set forth in claim 6, wherein said bead setting means is operative axially to hold the bead against the end of said drum during such axial outward movement of said register ring.

11. A machine as set forth in claim 6, wherein said bead support surface is serrated.

12. A machine as set forth in claim 6, further comprising bladder ply turn-up means for progressively wrapping the ply edge around the bead, and wherein said bead support means is operative to hold the bead in centered registry with the drum axis during operation of said turn-up means.

13. A machine as set forth in claim 6, wherein said means for folding includes an annular array of radially inwardly movable ply-down fingers, said fingers at the completion of the ply-down operation having their axially inner ends spaced slightly axially outwardly from said bead support means.

14. In a tire building machine, a tire building drum for receiving ply material in cylindrical fashion, means for folding ply material overhanging an end of the drum down over such drum end, axially movable bead setting means for setting a tire bead against such drum end with folded down ply material interposed between the bead and such drum end, ply turn-up means for progressively wrapping the ply edge around the bead, rigid annular bead support means for holding the tire bead coaxial with said drum during operation of said turn-up means, said drum having an annular radially extending end face against which the bead is set in place by said bead setting means, said bead support means having a radially outer, substantially cylindrical bead support surface which extends axially beyond said end face in radially inwardly offset relation to said end face, and means for axially outwardly moving said bead support means progressively to wipe overlying ply material against the inner diameter of the bead.

15. A machine as set forth in claim 14, wherein said bead setting means is operative axially to hold the bead against the end of said drum during such axial outward movement of said bead support means.

16. In a tire building machine, a tire building drum for receiving ply material in cylindrical fashion with at least one edge of such ply material extending axially beyond an end of said drum, bead setting means for setting a tire bead against the drum end with the overhanging ply material interposed between the bead and drum end, means for effecting initial tight wrapping of the overhanging ply material at the inside diameter of the bead, bladder ply turn-up means for completing progressive wrapping of the overhanging ply material around the bead, said means for effecting including a bead register ring coaxial with the axis of said drum, said ring having a radially outward, generally cylindrical bead support surface having a diameter less than the inner diameter of the bead by an amount less than the thickness of the ply material interposed between said bead support surface and the bead, and means for axially outwardly moving said register ring from a bead receiving position progressively to wipe overlying ply material against the inner diameter of the bead.

17. A machine as set forth in claim 16, comprising means for axially holding the bead against the end of said drum during such axial outward movement of said register ring.

18. A machine as set forth in claim 17, wherein said means for axially holding is said bead setting means.

19. A machine as set forth in claim 17, wherein said means for axially holding is the bladder of said turn-up means.

* * * * *